(12) United States Patent
Hulsing, II et al.

(10) Patent No.: US 6,435,029 B1
(45) Date of Patent: Aug. 20, 2002

(54) LOW METALIZATION CREEP SENSOR

(75) Inventors: Rand H. Hulsing, II, Redmond; Randy Sprague, Carnation, both of WA (US)

(73) Assignee: Honeywell International, Inc., Morristown, NJ (US)

(*) Notice: Subject to any disclaimer, the term of this patent is extended or adjusted under 35 U.S.C. 154(b) by 0 days.

(21) Appl. No.: 09/702,372

(22) Filed: Oct. 30, 2000

Related U.S. Application Data

(62) Division of application No. 09/104,844, filed on Jun. 25, 1998, now Pat. No. 6,161,440.
(60) Provisional application No. 60/055,646, filed on Aug. 14, 1997.

(51) Int. Cl.[7] ................................................ G01P 15/10
(52) U.S. Cl. ..................................................... 73/514.29
(58) Field of Search ........................ 73/514.18, 514.29, 73/514.32, 514.16, 514.34, 862.59; 310/321, 329, 370

(56) References Cited

U.S. PATENT DOCUMENTS

| | | | |
|---|---|---|---|
| 2,990,529 A | 6/1961 | Courtney-Pratt | 338/25 |
| 3,136,154 A | 6/1964 | Christensen | 73/88 |
| 3,323,092 A | 5/1967 | Balas et al. | 338/6 |
| 3,745,502 A | 7/1973 | Watanabe et al. | 338/73 |
| 4,244,225 A | 1/1981 | Greenwood | 73/517 AV |
| 4,679,434 A | 7/1987 | Stewart | 73/517 B |
| 4,901,570 A | 2/1990 | Change et al. | 73/517 |
| 4,939,935 A * | 7/1990 | Amand | 73/514.29 |
| 5,005,413 A | 4/1991 | Novack et al. | 73/517 AV |
| 5,020,370 A * | 6/1991 | Deval et al. | 73/514.29 |
| 5,221,400 A | 6/1993 | Staller et al. | 156/73 |
| 5,265,474 A * | 11/1993 | Chaffin et al. | 73/514.35 |
| 5,335,544 A | 8/1994 | Wagner et al. | 73/517 R |
| 5,367,217 A * | 11/1994 | Norling | 73/862.59 |
| 5,456,110 A | 10/1995 | Hulsing, II | 73/514.38 |
| 5,456,111 A * | 10/1995 | Hulsing, II | 73/514.32 |
| 5,501,103 A | 3/1996 | Woodruff et al. | 73/514.29 |
| 5,646,347 A | 7/1997 | Weiblen et al. | 73/514.32 |
| 5,717,140 A | 2/1998 | Hulsing, II | 73/504.16 |
| 5,752,410 A * | 5/1998 | Bernstein | 73/514.28 |

FOREIGN PATENT DOCUMENTS

EP 0 239 703 A1 12/1986
EP 0 239 703 B1 6/1991

* cited by examiner

*Primary Examiner*—Helen Kwok

(57) ABSTRACT

Performance-enhancing, reduced-area metalization adhesion areas in force-sensing transducers are described.

9 Claims, 6 Drawing Sheets

LOW METALIZATION CREEP SENSOR

CROSS-REFERENCE TO RELATED APPLICATION

This application is a divisional of and claims priority from U.S. patent application Ser. No. 09/104,844 filed Jun. 25, 1998 now U.S. Pat. No. 6,161,440, which claims priority from U.S. Provisional Application No. 60/055,646, filed Aug. 14, 1997, and incorporated by reference herein.

TECHNICAL FIELD

The present invention relates generally to force-sensing transducers, accelerometers, rate sensors, methods of forming force-sensing transducers, and to methods of forming vibrating-beam force transducers.

BACKGROUND OF THE INVENTION

Force-sensing transducers can be used to measure force, acceleration, pressure, and the like. One type of force-sensing transducer is a resonating force transducer. Exemplary transducers are described in U.S. Pat. Nos. 5,367,217, 5,339,698, and 5,331,242, the disclosures of which are incorporated by reference. Another type of force-sensing transducer is an accelerometer. Exemplary accelerometers are described in U.S. Pat. Nos. 5,594,170, 5,501,103, 5,379, 639, 5,377,545, 5,456,111, 5,456,110, and 5,005,413, which are incorporated by reference herein. Other types of force-sensing transducers can be used as rate sensors. Exemplary rate sensors are described in U.S. Pat. Nos. 5,717,140, 5,376,217, 5,696,323, 5,691,472, and 5,668,329, which are hereby incorporated by reference. Yet other force-sensing transducers can be used as acceleration and rate sensors. Exemplary sensors are described in U.S. Pat. Nos. 5,627, 314, 5,557,046, 5,341,682, 5,331,853, 5,331,854, and 5,319, 976, the disclosures of which are incorporated by reference herein.

Force-sensing transducers such as those incorporated by reference above, can experience problems associated with metalization which can adversely affect the transducer's performance. In particular, bias performance can be adversely affected when a conductor having a thermal coefficient of expansion different from that of the substrate, is deposited and used during operation. Specifically, metal conductors can be deposited at high temperatures and, because of the difference in thermal coefficient of expansion with the substrate, the deposited metal conductor can "creep" because of high thermal stress developed between the metal conductor and the substrate. Metal creep occurs when the deposited metal yields during the application of some external stimulant and does not return to its initial condition. The change in condition results in a change in bias operating point.

A preferred conductor material is gold. Gold is typically used in forming metal conductors on such substrates because it exhibits high conductivity and other traits normally associated with noble metals. However, forming the metal conductors using gold exacerbates the adverse effects on bias performance because gold has a very high thermal expansion coefficient relative to typical substrate materials such as quartz and silicon. Additionally, gold has a very low yield strength.

Traditional methods of reducing metal creep include using metal alloys with higher yield strength than pure gold, using alloys with thermal coefficients of expansion closely matched to the particular substrate material, removing metalization layers all together, compensating the metal creep effects by matching metal conductors on opposing surfaces, and designing a very low spring rate support structure to counter the effects of creep.

This invention arose out of concerns associated with providing improved force-sensing transducers, accelerometers, and rate sensors. This invention also arose out of concerns associated with providing improved methods of forming force-sensing transducers such as those mentioned above.

SUMMARY OF THE INVENTION

Force-sensing transducers, accelerometers, rate sensors, and methods of forming force-sensing transducers are described.

In one embodiment, a substrate includes a force-sensing element. An adhesion layer is disposed over less than an entirety of the force-sensing element, and a conductive layer is disposed over the force-sensing element and supported in a bonded relationship therewith through the adhesion layer.

In another embodiment, a substrate includes a proof mass and a vibratable assembly connected therewith and configured to detect an acceleration force. An adhesion layer is disposed over less than an entirety of the vibratable assembly, and a conductive path is disposed over the vibratable assembly and fixedly bonded therewith through the adhesion layer.

In another embodiment, a Coriolis rate sensor includes a substrate having a vibratable assembly connected therewith. An adhesion layer is disposed over less than an entirety of the vibratable assembly and a conductive path is disposed over the vibratable assembly and fixedly bonded therewith through the adhesion layer.

In yet another embodiment, a substrate is provided having a force-sensing element defining an area over and within which a conductive layer of material is to be formed. A patterned adhesion layer is formed over less than an entirety of the area. A conductive layer is formed over the area and bonded to the substrate through the patterned adhesion layer.

In still another embodiment, a substrate is provided and etched sufficiently to form a plurality of vibratable beams arranged in a force-sensing configuration. An insulative layer of material is formed over the vibratable beams and an adhesion layer pattern is formed over the vibratable beams. The pattern comprises a plurality of spaced-apart pattern components, with each beam having three pattern components spaced apart along its length. Conductive material is formed over the vibratable beams and the adhesion layer pattern. The conductive material is more fixedly attached to the adhesion layer pattern than to vibratable beam portions not having the adhesion layer pattern thereover. The substrate is temperature cycled effective to weaken the attachment between the conductive material and the vibratable beam portions not having the adhesion layer pattern thereover.

DETAILED DESCRIPTION OF THE PREFERRED EMBODIMENTS

FIGS. 1–4 show various embodiments of force-sensing transducers which can be utilized in connection with one or more embodiments of the invention described below.

Figure 1:
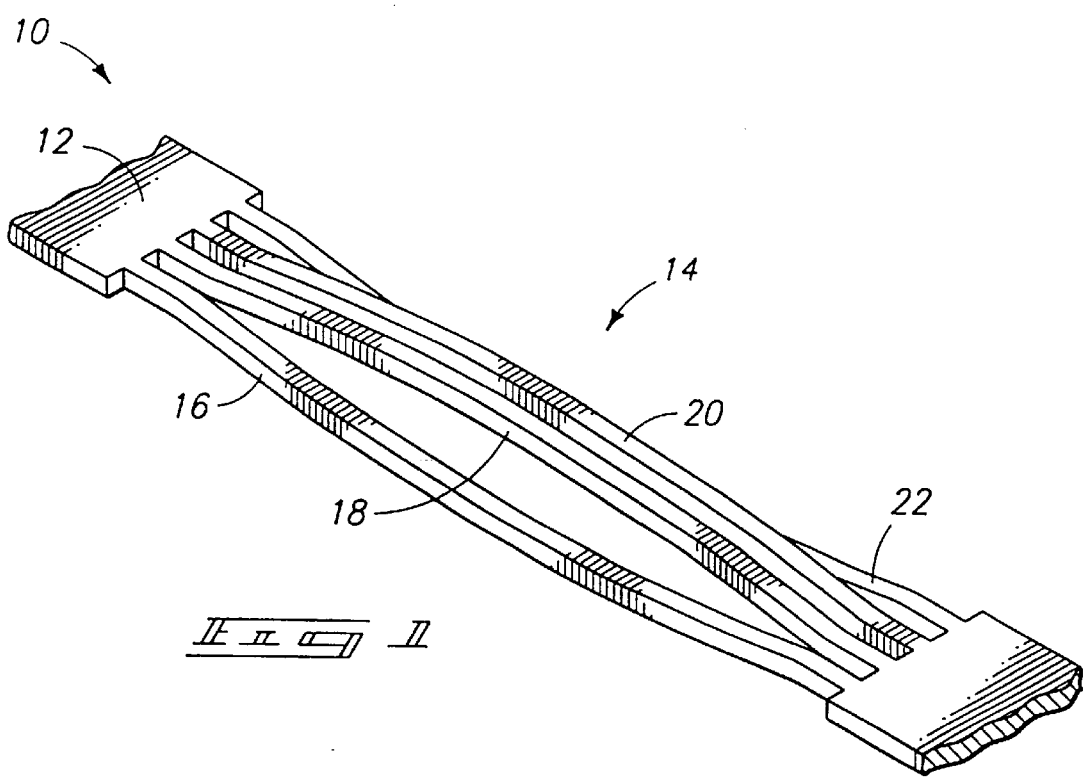
FIG. 1 is a perspective view of a force-sensing transducer which can be utilized in connection with one or more embodiments of the invention.

FIG. 1 shows a force-sensing transducer generally at 10 which can be used in connection with one or more embodiments of the invention described below. Transducer 10 includes a substrate 12 having a force-sensing element 14 which is preferably etched from the substrate material. In the illustrated and preferred embodiment, force-sensing element 14 comprises a vibratable assembly having a plurality of vibratable beams 16, 18, 20, and 22. Of course, more or less beams can be provided. In a preferred embodiment, the force-sensing element comprises an integral material, with crystalline silicon being preferred. The specific force-sensing transducer shown in FIG. 1 is described in more detail in U.S. Pat. No. 5,367,217, incorporated by reference above.

Figure 2:
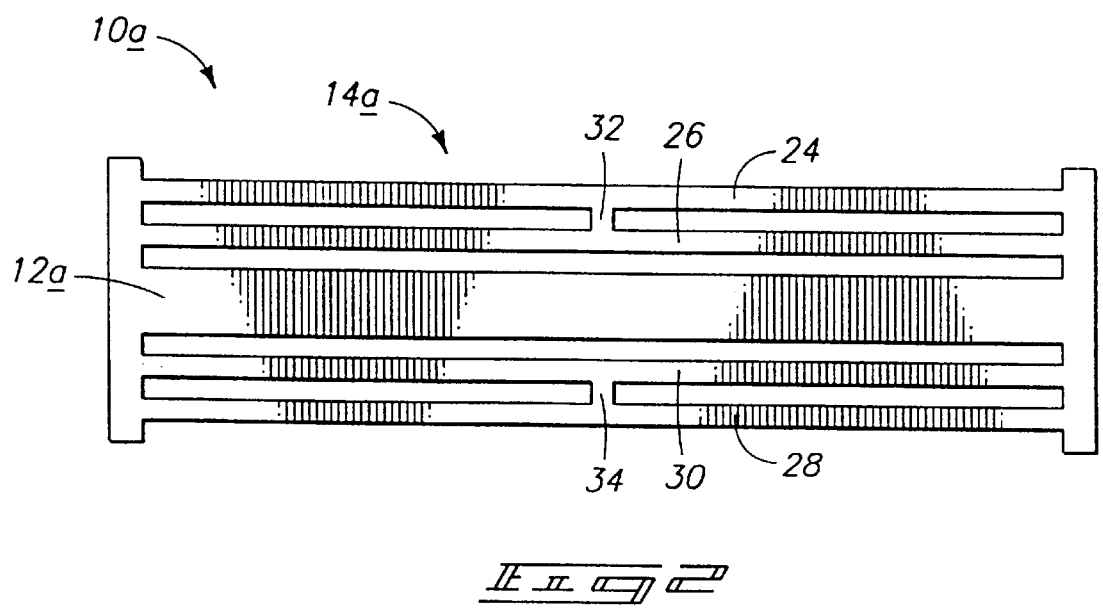
FIG. 2 is a top plan view of a different force-sensing transducer which can be utilized in connection with one or more embodiments of the present invention.

FIG. 2 shows a different force-sensing transducer generally at 10a. Like numerals from the above-described embodiment have been utilized where appropriate, with differences being indicated by the suffix "a" or with different numerals. Force-sensing transducer 10a is configured as an angular rate sensor or Coriolis rate sensor. Vibratable assembly 14a includes a plurality of vibrating beams 24, 26, 28, and 30 defining an outer pair of vibrating beams 24, 28, and an inner pair of vibrating beams 26, 30. Outer beams 24, 28 are mechanically coupled to the inner beams 26, 30 by way of interconnecting members 32, 34. Interconnecting members 32, 34 are formed generally at the midpoint of outer beams 24, 28 and inner beams 26, 30. Beams 24, 26, 28, and 30, as well as interconnecting members 32, 34 are formed by forming slots (not specifically designated) between the beams. The operation of force-sensing transducer 10a is described in detail in U.S. Pat. No. 5,717,140 incorporated by reference above.

Figure 3:
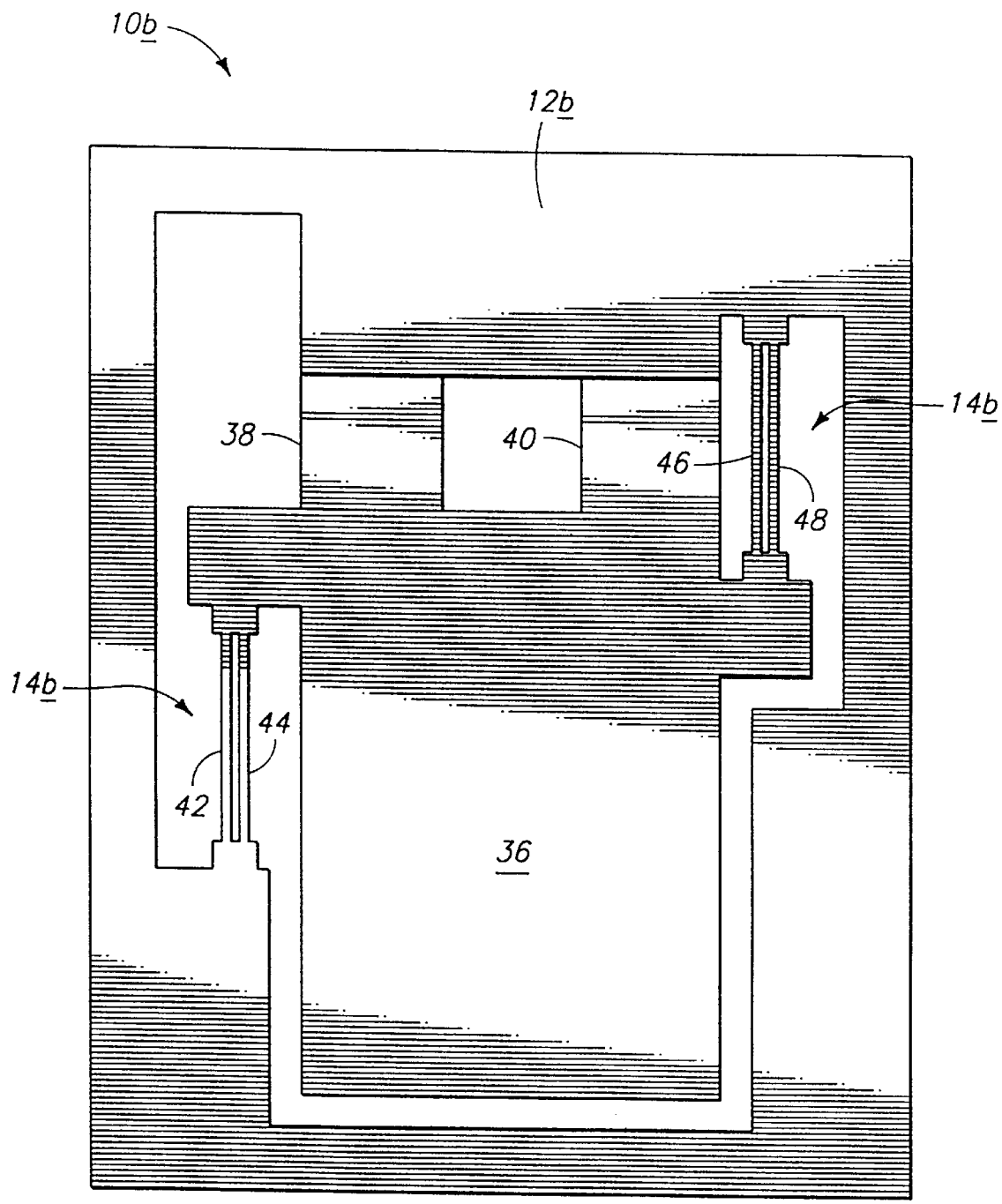
FIG. 3 is a top plan view of an accelerometer which can be utilized in connection with one or more embodiments of the present invention.

FIG. 3 shows a force-sensing transducer in the form of an accelerometer generally at 10b, which can be configured in accordance with various embodiments of the present invention. Like numerals from the above-described embodiments are utilized where appropriate, with differences being indicated by the suffix "b" or with different numerals.

Accelerometer 10b is preferably formed from a single wafer of silicon through micromachining techniques. Accelerometers such as this and others are described in U.S. Pat. No. 5,005,413, which is incorporated by reference above.

Accelerometer 10b is configured as a force-sensing transducer which senses an acceleration force which acts upon the accelerometer. In this example, substrate 12b includes a proof mass 36 and a vibratable assembly 14b connected therewith and configured to detect the acceleration force. Proof mass 36 is supported by a pair of flexures 38, 40. In this example, force-sensing transducer 10b comprises a vibrating beam accelerometer whose vibratable assembly 14b comprises a plurality of vibratable beams 42, 44 and 46, 48. The beams are arranged, together with proof mass 36, in a configuration which develops different vibratory frequencies responsive to movement or deflection of proof mass 36 in accordance with an acceleration applied thereto. The various frequencies at which the beams vibrate give an indication of the acceleration force acting upon the proof mass. The acceleration-sensing operation of this force-sensing transducer is described in U.S. Pat. No. 5,379,639 incorporated by reference above.

Briefly, vibratable assembly 14b is configured into a push-pull configuration such that when proof mass 36 experiences an acceleration, it is moved or deflected along an input axis either generally into or out of the plane of the page upon which FIG. 1 appears. Such movement or deflection causes one of the pairs of beams 42, 44 or 46, 48 to go into tension, and the other of the pairs of beams to go into compression. As this compression and tension occurs, the respective frequencies at which the beams vibrate change in a known and measurable manner.

Figure 4:
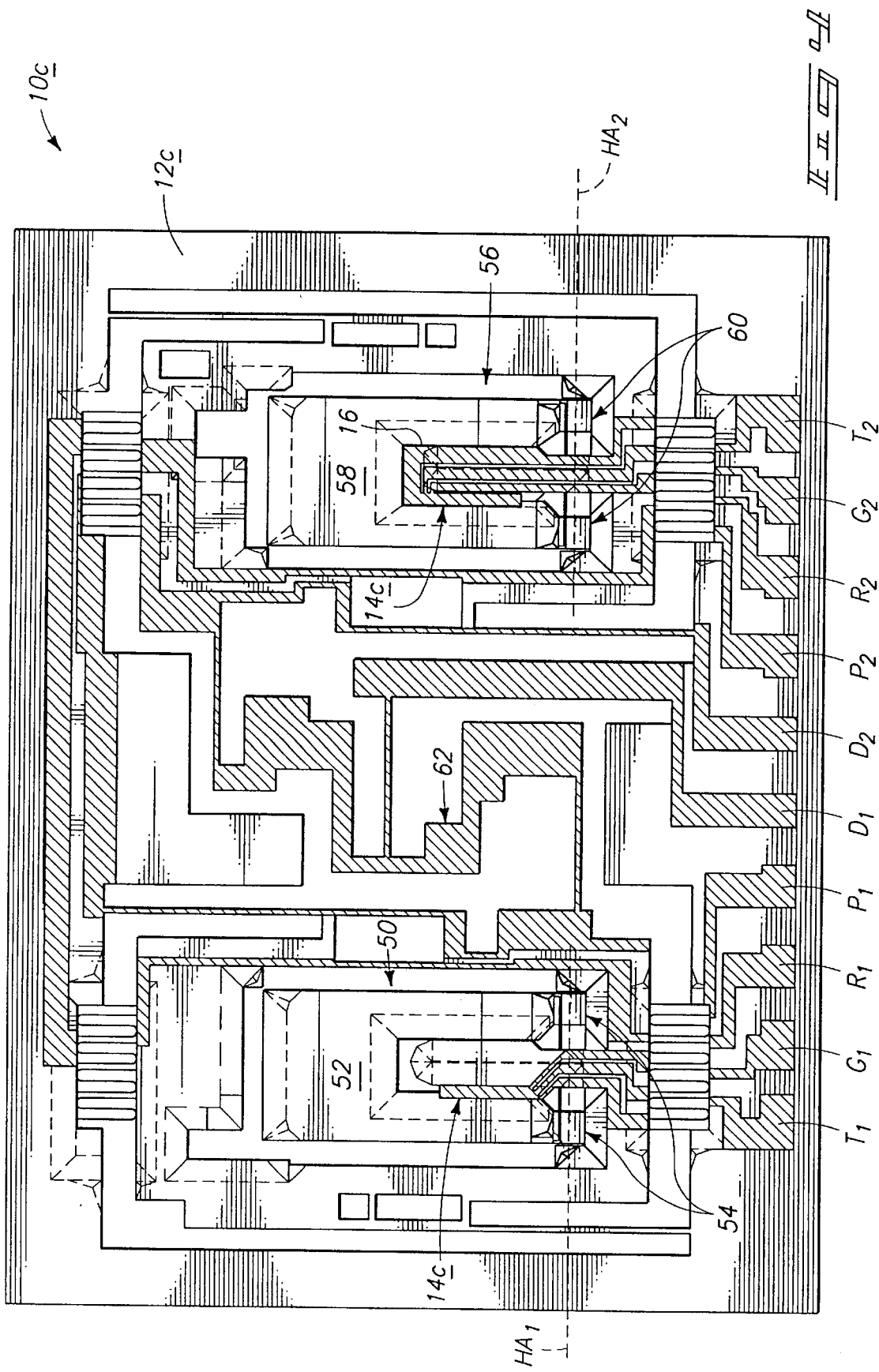
FIG. 4 is a top plan view of an acceleration and rate sensor which can be utilized in connection with one or more embodiments of the present invention.

FIG. 4 shows a force-sensing transducer 10c in the form of an acceleration and angular rate sensing device. In the illustrated example, the device includes a first accelerometer 50 having a proof mass 52 connected to substrate 12c by a pair of flexures 54. The flexures define a hinge axis $HA_1$ for proof mass 52. A second accelerometer 56 is provided and includes a proof mass 58 and a pair of flexures 60 connecting the proof mass to substrate 12c. Flexures 60 define a second hinge axis $HA_2$ for proof mass 58. A pair of force-sensing elements 14c are provided in the form of a vibratable assembly similar to the one described below in FIG. 5. A link 62 is provided and connects accelerometers 50, 56 together and acts as a rocker arm to ensure that the accelerometers can be dithered 180° out of phase. A discussion of various aspects of the dynamics of dithering as such pertains to accelerometers and rate sensors can be found in many of the references above. The specific structure and operation of the FIG. 4 acceleration and rate sensor is described in U.S. patent application Ser. No. 08/949,883, the disclosure of which is incorporated by reference herein.

A plurality of contact pads $T_1$, $G_1$, $R_1$, $P_1$, $D_1$, and $D_2$, $P_2$, $R_2$, $G_2$, and $T_2$, are disposed over the substrate and provide contacts through which desirable electrical connection can be made to outside-world circuitry for the dither drive, dither pick-off, beam or tine drives, and beam or tine pick-offs. Conductive material, such as gold, is disposed over the contact pads and various other areas of the substrate including vibratable assemblies 14c.

In the devices described above, each uses a vibratable assembly to sense a force such as acceleration or angular rate. Aspects of the invention described just below are well suited for implementation in connection with these and other devices.

Figure 5:
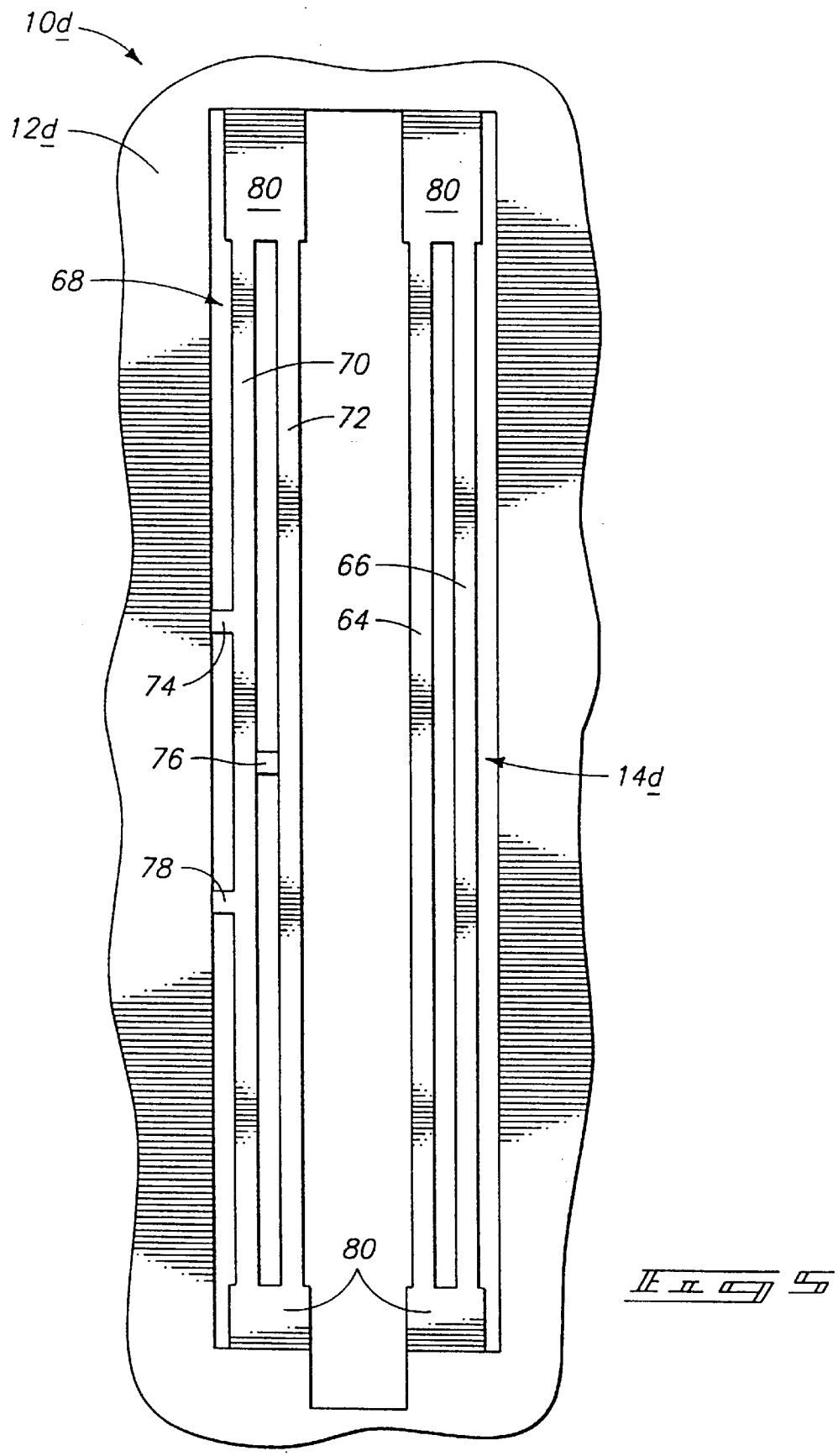
FIG. 5 is a top plan view of a force-sensing transducer in accordance with one embodiment of the present invention.

For illustrative purposes only, an exemplary force-sensing transducer is shown in FIG. 5 generally at 10d. Like numerals from the above-described embodiment have been utilized where appropriate, with differences being indicated with the suffix "d" or with different numerals. A force-sensing element or vibratable assembly 14d is provided and includes a plurality of beams 64, 66 which are preferably vibratable. A non-vibratable assembly 68 is provided for supporting a reference resistor which will ultimately be formed when conductive material is provided over the vibratable and non-vibratable assemblies 14d, 68 respectively. Non-vibratable assembly 68 includes a pair of beams 70, 72 which are tied together by a plurality of pins 74, 76, and 78. Beams 70, 72 do not vibrate and are provided to match the electrical path resistance of beams 64, 66 when conductive material is disposed thereover. When an electrical current is provided over a conductive path over vibrating beams 64, 66, a voltage drop develops relative to those beams. Similarly, a current provided over beams 70, 72 develops a generally identical voltage drop such that the two voltage drops can be subtracted from one another and cancel. This assists outside circuitry in its discrimination of the feedback signals from the vibrating beams. Support structures 80 are provided and tie the ends of both the vibratable and non-vibratable beams together. Beams 64, 66, 70, and 72 extend along respective long axes and define individual respective areas over and within which a conductive layer of material is to be formed.

Figure 6:
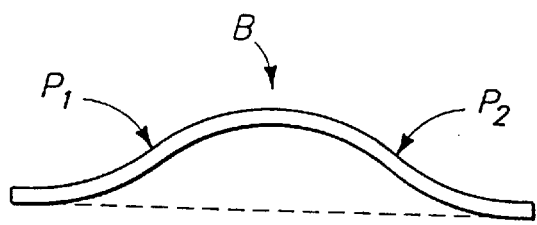
FIG. 6 is an exaggerated elevational view of a vibrating beam clamped on both ends, and shown in an excited state.

FIG. 6 shows an exemplary schematic of a beam B with neutral inflection points $P_1$ and $P_2$. A discussion of neutral inflection points occurs in U.S. Pat. No. 5,717,140 incorporated by reference above.

Figure 8:
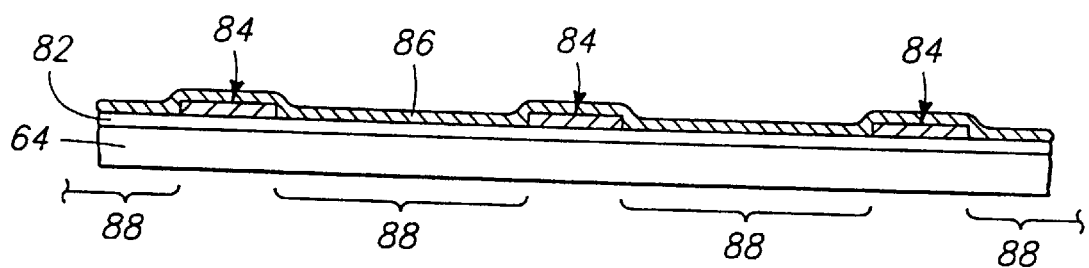
FIG. 8 is a view which is taken along line 8—8 in FIG. 7, and shows a portion of the illustrated force-sensing transducer at a processing step which is subsequent to that which is shown in FIG. 7.
Figure 7:
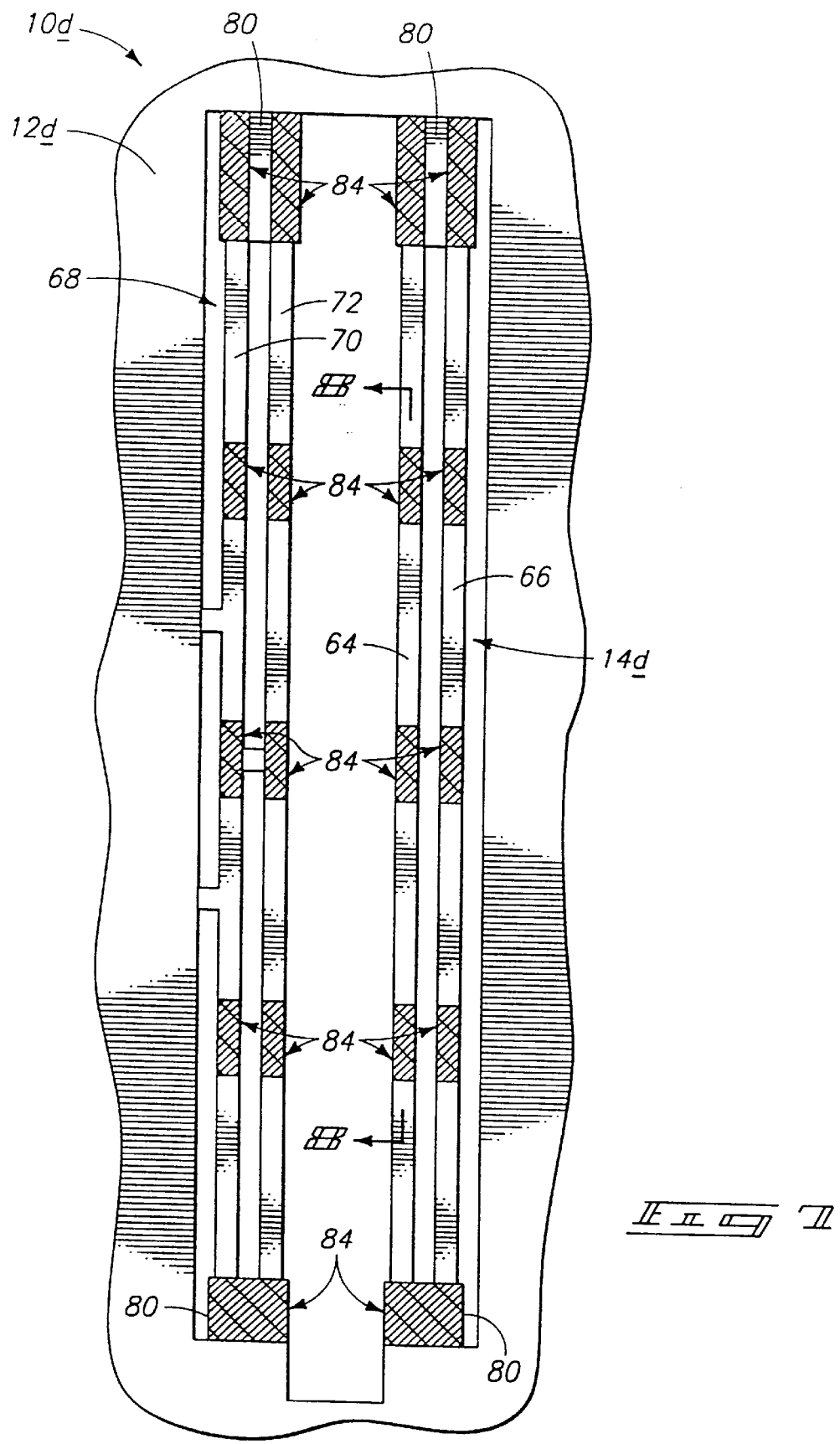
FIG. 7 is a view of the FIG. 5 force-sensing transducer at a processing step which is subsequent to that which is shown in FIG. 5.

Referring to FIGS. 7 and 8, an insulative material layer 82 is formed over the beam assemblies. An exemplary material is silicon dioxide which can be grown to a thickness of 5,000 Angstrom. An adhesion layer pattern 84 is formed over substrate 12d. In the illustrated example, adhesion layer pattern 84 is formed over both the vibratable assembly 14d and the non-vibratable assembly 68. In addition, the adhesion layer pattern is formed over support structures 80 as shown. The adhesion layer pattern is preferably disposed over less than an entirety of force-sensing element or vibratable assembly 14d. In one embodiment, adhesion layer pattern 84 comprises a plurality of discrete layers which are spaced apart over vibratable assembly 14d. In the illustrated example, each beam 64, 66, 70, and 72 includes three discrete layers of adhesion material. Accordingly, the individual discrete layers define a plurality of spaced-apart pattern components which are disposed along each beam's length.

In a preferred embodiment, each vibratable beam has at least one neutral inflection point such as $P_1$ and $P_2$ (FIG. 6) and one of the discrete adhesion layers is disposed over the one neutral inflection point. In the illustrated example, beams 64 and 66 have two neutral inflection points which are disposed on either side of the beam's centermost point. As viewed in FIG. 8, the leftmost and rightmost adhesion layer patterns 84 are disposed over the neutral inflection points of beam 64. Accordingly, each vibratable beam has at least one neutral inflection point having a discrete adhesion layer disposed thereover. In a most preferred embodiment, each beam has a discrete layer disposed over its centermost point, as well as each neutral inflection point. In this example, each beam has no more than three discrete adhesion layers disposed thereover and spaced therealong.

A preferred material for the adhesion layer pattern is chrome which can be patterned onto the beams through shadow masking techniques. Other manners of providing a patterned adhesion layer can be used. An exemplary thickness for the patterned adhesion layer is 100 Angstrom. In this example, the preferred chrome is deposited at both ends of a vibrating beam in 67-micron-wide sections. Limiting the chrome deposition to support structures 80 and the above-described three spaced-apart locations, reduces the total area of chrome deposition from about 1,000 microns to about 200 microns which results in a 5-to-1 reduction in the adhesion area.

Accordingly, application of the present invention to a vibrating beam provides advantages which help to reduce metal creep. By defining the chrome deposition areas at the neutral bending or inflection points, e.g. approximately 22.4% of the length from where the beam attaches to support structures 80, the stress in the conductor, in this case gold, is further reduced. Defining a chrome deposition area at the midpoint of the beam tends to stress the deposited metal less than elsewhere, though the midpoint is not at a neutral inflection point. Thus, the gold is bonded to the beam through the chrome interface at three points along the length of the conductive path, as well as at both ends. The number of points of attachment and the area of adhesion can be varied as those of skill in the art will realize, by reducing the attachment width to achieve a similar overall reduction in the attachment area. Similarly, the pattern may be varied along the width of the beam as well as along its length, for example, in a checkerboard pattern. While there are innumerable numbers of pattern variations, the spirit of the invention remains the same in reducing metal creep effects by reducing the total adhesion area.

FIG. 8 shows a conductive material layer or path 86 formed over vibratable beam 64 and the adhesion layer pattern 84. Conductive layer 86 is more fixedly attached to the adhesion layer pattern than to vibratable beam portions 88 which do not have adhesion layer pattern 84 thereover.

Figure 9:
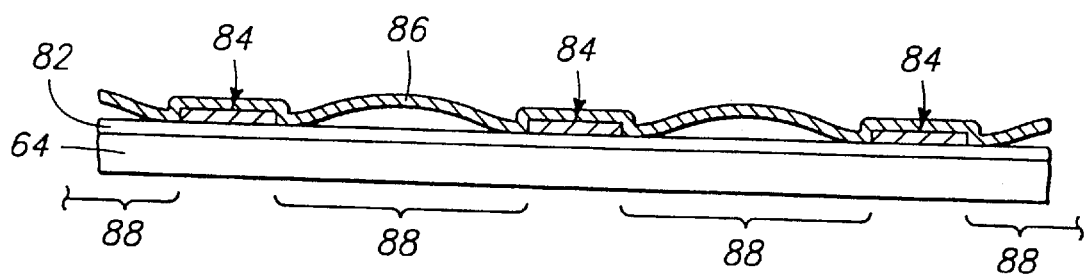
FIG. 9 is a view of the FIG. 8 force-sensing transducer portion at a processing step which is subsequent to that which is shown in FIG. 8.

FIG. 9 shows vibrating beam 64 after the beam has been temperature cycled to effectively weaken the attachment between conductive material 86 and vibratable beam portions 88. By temperature cycling the finished beam over a greater range of temperatures than expected during actual use, for example temperature cycling from −65° C. to 135° C. for use from −55° C. to 125° C., the conductive material 86, e.g. gold-to-oxide, adhesion bond is broken in the oxide area but the conductive material-to-chrome bond remains intact. Particularly, the excess cold cycle stresses the gold past its yield point which helps activate the reduction in metal creep. Such temperature cycling causes a portion of conductive layer 86 which is not bonded with the patterned adhesion layer to separate from the underlying substrate material.

Some of the advantages achieved by the present invention are that adverse effects of metalization on bias performance in force transducers can be reduced by providing a large reduction in metal creep while using standard conductors such as gold. Reductions in metal creep are achieved through the provision of reduced metalization adhesion areas. In vibrating beam force sensors, additional bias performance enhancement can be provided by forming the metalization adhesion areas at a beam's neutral inflection point(s). Such advantages can be achieved without meaningful increases in cost by using traditional metalization materials, for example, gold, and by taking advantage of readily available supplies, masks, and processing procedures.

The invention has been described in compliance with the applicable statutes. Variations and modifications will be readily apparent to those of skill in the art. It is therefore to be understood that the invention is not limited to the specific features shown and described, since the disclosure comprises preferred forms of putting the invention into effect.

The invention is, therefore, to be interpreted in light of the appended claims appropriately interpreted in accordance with the doctrine of equivalents.

What is claimed is:

1. An accelerometer comprising:
a substrate having a proof mass and a vibratable assembly connected therewith, the proof mass and the vibratable assembly being configured to detect an acceleration force;
an adhesive layer disposed over less than an entirety of the vibratable assembly; and
a conductive path disposed over the vibratable assembly and intermittently supported in a bonded relationship therewith through the adhesive layer, said bonded relationship consisting of a reduced bonding area that is less than the area of said conductive path.

2. The accelerometer of claim 1, wherein the adhesion layer comprises a plurality of discrete layers spaced apart over the vibratable assembly.

3. The accelerometer of claim 1, wherein the vibratable assembly comprises a vibratable beam, and the adhesion layer comprises a plurality of discrete layers spaced apart over the vibratable beam.

4. The accelerometer of claim 3, wherein the adhesion layer comprises three discrete layers.

5. The accelerometer of claim 3, wherein the vibratable beam has at least one neutral inflection point, and one of the discrete layers is disposed over the one neutral inflection point.

6. The accelerometer of claim 1, wherein the vibratable assembly comprises a plurality of vibratable beams, and the adhesion layer comprises a plurality of discrete layers spaced apart over individual beams.

7. The accelerometer of claim 6, wherein each beam has a plurality of discrete layers spaced thereover.

8. The accelerometer of claim 7, wherein each beam has at least one neutral inflection point having a discrete layer disposed thereover.

9. The accelerometer of claim 7, wherein each beam has a discrete layer disposed over said beam's centermost point.

* * * * *